3,022,161
PROCESS OF DETINNING LACQUERED TIN SCRAP DERIVED FROM TIN SHEET METAL
Friedrich Finkener and Johannes Krug, Essen, Hans Loges, Essen-Steele, and Bernhard Rodewald, Essen-Haarzopf, Germany, assignors to Th. Goldschmidt A.-G., Essen, Germany
No Drawing. Filed Mar. 21, 1960, Ser. No. 16,190
Claims priority, application Germany Apr. 4, 1959
10 Claims. (Cl. 75—98)

This invention relates to a process of detinning scrap material, in particular, lacquered tin sheet waste.

Heretofore it was the practice to detin tin plate or tin sheet scrap by subjecting same to the treatment with aqueous alkalies. Either an alkaline-electrolytic process is carried out to obtain metallic tin directly, or an alkaline-chemical process is applied, wherein tin is removed as stannate and then processed toward the obtainment of tin or tin products.

Considerable difficulties have been encountered in the performance of these detinning processes, because the starting material to be detinned, is coated with lacquers, e.g. made of polyvinyl chloride or epoxy resins, phenol resins, or oil and similar synthetic resins.

In such cases it is no longer possible to carry out an almost complete detinning process in an economical manner and in operationally suitable periods of time.

It has now been found that these difficulties are overcome if scrap from lacquered tin plate or sheet is subjected to a predetermined preliminary thermal treatment by means of a selected fluid before conventional detinning may be achieved.

However, in such thermal treatment when carried out at too high a temperature, it has been surprisingly discovered that besides any tin-iron alloys heretofore existing a rebuilding or new formation of such alloys occurred, which then renders a practically complete detinning step impossible. Experiments have shown that lacquered tin plate scrap which had been heated for half an hour to 400° C. can be detinned only to a residual tin content of 0.31% in the treated sheet metal.

It is, therefore, an important object of the invention to provide means facilitating the recovery of tin ingredients from tin containing waste or scrap in a highly economical and speedy procedure.

It is another advantage of the present invention to provide means instrumental in carrying out a novel process for detinning material without the need of expensive or complicated apparatus.

According to the invention, therefore, lacquered tin plate scrap is thermally pretreated only up to such temperatures which preclude a rebuilding or formation of tin-iron alloys. This is achieved in that lacquered scrap of the aforesaid type is heated within a period of time as short as possible to temperatures of from 230° C. to at most 350° C., preferably to about 280° C. The lacquers are thereby chemically sufficiently modified to such an extent, that practically a complete detinning is accomplished economically by means of applying aqueous alkalies thereto.

It has further been found that thermal pretreatment of lacquered tin plate scrap by means of hot air or hot inert gases is particularly suitable for achieving this desired goal.

By rapid heat transfer the treatment time is shortened to 3 to 30 minutes, preferably 10 to 15 minutes, so that such a short pretreatment is sufficient to thermally decompose the synthetic lacquers and to prevent the formation of tin-iron alloys anew. A practically complete detinning of lacquered tin plate scrap has thus become possible.

It has further been found that almost a complete detinning can be achieved in the usual manner, also in treating lacquered tin plate or sheet by means of saturated steam or superheated steam before detinning at 120° to 250° C., preferably at 160° to 180° C.

It is still another object of the invention to provide means conducive to a very efficient process for recovering tin from any waste or scrap of tin sheet at considerably increased yield, even if such material is provided with a lacquer coating and the like.

This novel process is based on the fact that with steam or superheated steam of, for example, 170° C. and a corresponding pressure of about 8 atm. abs. a rapid destruction or swelling of the applied lacquer coating is obtained, as a result of an adequate good heat transfer.

It has been found that a further favorable effect can be exerted by steam or superheated steam due to the addition of special chemicals in combination with said steam atmosphere. Thus, lacquers difficult to attack and remove, are very rapidly influenced and subjected in said treatment to additional substances producing an alkaline reaction, such as soda lye, potash lye, amines, or ammonia, or by the addition of lacquer-dissolving solvents, e.g. higher boiling ketones, such as cyclohexanone. The lacquers are then destroyed or swelled to such an extent, that thereafter a satisfactory detinning is achieved.

Further objects will appear from the ensuing detailed description of the invention in which preferred processes for the detinning of scrap material will be described.

The following examples carried out in a laboratory will serve to illustrate more particularly some of the fundamental aspects of the present invention.

*Example I*

Tin plate scrap having a tin coat of 1.03%, one side of which was covered with a lacquer of vinyl phenol resin type and the other side with a lacquer of unknown type, was detinned without pretreatment in the usual manner through treatment with soda lye. The residual tin content after detinning was 0.39% Sn on said treated plate.

A similar sample, which had been heated to about 280° C. for about 15 minutes by means of heated air, showed after detinning a residual tin content of only 0.046% Sn.

*Example II*

Tin plate scrap having applied thereto a tin content of 2.4%, one side of which was covered with lacquer of an oil resin type and the other side was not covered by a lacquer, was detinned in the known manner. The residual tin content on the plate amounted to 0.16% Sn.

A second sample of the same tin plate scrap was, however, treated for about 5 minutes with hot air heated to 280° C. On the treated plate there remained after detinning only 0.042% Sn.

*Example III*

Tin plate scrap containing 0.75% Sn, whose one side was coated with epoxide resin lacquer and further over same with a polyvinyl chloride lacquer and whose other side was lacquered with phenol resin, was detinned in the known manner. The residual tin content on the scrap amounted to 0.36% Sn.

A second sample of the same plate scrap, which had been thermally pretreated to about 280° C. by means of inert gases for about 10 minutes, resulted after detinning in a residual tin content of 0.049% Sn.

*Example IV*

Tin plate scrap coated on one or both sides with synthetic resin lacquers, e.g. on polyvinyl chloride basis, phenol resin, polyester or polystyrene, etc., was placed in a pressure vessel and charged with steam of 180° C.

after closing of the vessel. The contents after having assumed during about 5 to 15 minutes an even temperature of 170–180° C., were left under an adjusted pressure and the tin plate scrap was detinned by the usual detinning step. The residual amount of tin remaining on the plate after detinning was on the average 0.03%.

The same scrap material was subjected to the usual detinning process without previous treatment with steam or superheated water. Detinning was incomplete. The tin content remaining on the plate amounted to between 0.1 to 0.4%.

*Example V*

In the same manner as described in Example IV, heavily lacquered tin plate scrap was treated with superheated steam of 180° C. and subjected to detinning after 5–15 minutes. The residual tin content on the plate scrap was again on the average about 0.03%.

*Example VI*

Delacquering was carried out as described in Example IV, only the steam was additionally admixed with 1% of ammonia. After this treatment the lacquer layer application was subjected to a much stronger attack than in the treatment with pure steam. Detinning was again highly satisfactory; the residual tin content on the plate amounted to about 0.03%.

*Example VII*

The procedure was as stated in Example VI, except that instead of ammonia 1% of cyclohexanone was admixed to the steam. In this case, too, there resulted a much stronger attack on the lacquer stratum. The subsequent detinning showed the same uniform satisfactory result.

Thus, it can be seen that, according to a broad view of the present invention, there has been provided a process of detinning, in particular, lacquer-layered scrap of tin plate material, comprising the steps of subjecting said scrap to a combination of heat treatment by applying thereto a hot fluid in the form of hot air, hot inert gases, steam, hot water and like fluid having a temperature of about 160° to 350° C. whereby into said fluid is further introduced one or more substances selected from the group comprising soda lye, potash lye and amines, or ammonia or any suitable lacquer solvent, such as higher boiling ketones admixed to said fluid, such as steam, whereby within a predetermined period of time of preferably less than 30 minutes the lacquer layer is swelled and/or removed in order to follow up the conventional detinning operation.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. The process of detinning scrap of lacquer-layered tin covered plate material; comprising the steps of first subjecting said scrap to a thermal pretreatment by means of a fluid whose temperature ranges from 160° to less than 350° C. to bring about quick disintegration of the lacquer layer, and then following up the detinning operation proper by applying aqueous alkali solution to said pretreated scrap material without adversity affecting the plate material.

2. The process according to claim 1, said thermal pretreatment being effected between 230° and 350° C. for a period of about 3 to 30 minutes.

3. The process according to claim 1, wherein said fluid is an inert fluid.

4. The process according to claim 1, said thermal pretreatment being effected before detinning during a short period of time in a closed pressure vessel with steam at about 160° to 250° C.

5. The process according to claim 3, including the step of introducing into said fluid a lacquer-dissolving substance selected from the group consisting of soda lye, potash lye, amines, ammonia and cyclohexanone.

6. The process according to claim 3, including the step of admixing ammonia, as a lacquer-dissolving solvent to said fluid, said fluid being superheated steam.

7. The process of detinning tin plate having a tin coat of 1.3% and covered with a lacquer of vinyl phenol resin, comprising the steps of heating said scrap to about 280° C. for about 15 minutes by means of heated air, and then subjecting said heated scrap to an after-treatment with soda lye, thereby obtaining a residual tin content of about 0.046% tin.

8. The process of detinning resin-lacquered, tin-coated scrap base material comprising the steps of first applying to said material an inert fluid heated to a temperature above that of the melting point of tin and ranging from about 160 to 250° C. during a period of about 10 to 15 minutes to decompose the lacquer and to prevent the formation of a tin alloy with base material, and thereafter subjecting the resultant base material to a detinning action by means of an aqueous alkali substance.

9. The process according to claim 8, wherein the process is carried out in a pressure vessel and said fluid consists of steam heated to a temperature of 160° to 250° C.

10. The process according to claim 9, including the step of adding to said steam a lacquer-dissolving substance selected from the group consisting of soda lye, potash lye, amines, ammonia and cyclohexanone.

References Cited in the file of this patent

UNITED STATES PATENTS

| | | |
|---|---|---|
| 906,321 | Sperry | Dec. 8, 1908 |
| 1,370,188 | Cleveland | Mar. 1, 1921 |
| 2,564,129 | Rotelli | Aug. 14, 1951 |